United States Patent [19]

Sekmakas et al.

[11] Patent Number: 4,739,004
[45] Date of Patent: Apr. 19, 1988

[54] CROSS-LINKED DISPERSION COPOLYMERS CONTAINING VINYL ACETATE

[75] Inventors: Kazys Sekmakas, Des Plaines; Raj Shah, Schaumburg, both of Ill.

[73] Assignee: DeSoto, Inc., Des Plaines, Ill.

[21] Appl. No.: 938,861

[22] Filed: Dec. 8, 1986

[51] Int. Cl.$^4$ ................................................ C08F 2/16
[52] U.S. Cl. .................................. 524/458; 524/832; 524/833; 526/232.2
[58] Field of Search ............... 524/459, 457, 832, 833, 524/458; 526/232.2

[56] References Cited

U.S. PATENT DOCUMENTS 4,110,288  8/1978  Schirmann et al. ................. 524/457
4,290,932  8/1981  Wright et al. ....................... 524/523

Primary Examiner—Joseph L. Schofer
Assistant Examiner—Angela L. Fugo
Attorney, Agent, or Firm—Dressler, Goldsmith, Shore, Sutker & Milnamow, Ltd.

[57] ABSTRACT

Cross-linked dispersion copolymers are disclosed which are produced by the aqueous emulsion copolymerization of from 15% to 80% of vinyl acetate, and from 5% to 70% of polyethylenically unsaturated cross-linking agent, like hexane diol diacrylate, from 1% to 40% of other copolymerizable monoethylenically unsaturated monomer being desirably present, preferably from 5% to 25% of a reactive monomer which is desirably hydroxyl-functional. The dispersion copolymers are suspended in active organic solvents which extensively swell the copolymer particles. These suspensions are useful in thermosetting solution coating compositions where they provide improved thermal sag resistance.

16 Claims, No Drawings

CROSS-LINKED DISPERSION COPOLYMERS CONTAINING VINYL ACETATE

TECHNICAL FIELD

This invention relates to cross-linked dispersion copolymers and to organic solvent solution coatings containing the same.

BACKGROUND ART

The production of solvent insoluble microgel particles and their use in solution coating compositions to provide sag resistance as the deposited coatings cure, usually as they are baked to provoke some thermal curing reaction, is known. This is shown in H. J. Wright et al. U.S. Pat. Nos. 4,290,932 and 4,377,661 where the microgel particles are prepared by the aqueous emulsion polymerization of a mixture of ethylenically unsaturated monomers, at least one of which is an acrylic or methacrylic acid, or an hydroxy-substituted alkyl ester thereof, another of which is an alkyl ester of an acrylic or methacrylic acid, styrene or alpha-methyl styrene, and a multifunctional cross-linking agent which is a polyethylenically unsaturated material. The microgel particles are insoluble in the organic solvent which is selected, and after removal of water the dispersion of insoluble particles in organic solvent is incorporated into a solution coating composition containing a dissolved copolymer which also contains acid or hydroxy groups and which are prepared from monomers selected in the same way indicated previously. In the issued patents, the particles of microgel solids are required to be present in an amount of from 5% to 15% of the total resin solids.

It is desired to provide cross-linked dispersion copolymers which exhibit extensive swellability in the selected solvents, but which can be used in much the same way as the microgel particles in the prior art, and which can be made using large amounts of less costly monomers. These cross-linked dispersion copolymers are effective when introduced into solution coating compositions to enhance sag resistance even when used in smaller amounts, preferably below 3%, and more preferably below 1% of the total resin solids. It is also desired to provide organic solvent solution coating compositions which possess improved viscosity stability, whereas the coating compositions of the prior art were not stable, and increased in viscosity with time.

DESCRIPTION OF INVENTION

In accordance with this invention, it has been found that the presence of significant amounts of vinyl acetate allows one to provide solvent-swellable cross-linked dispersion copolymers by copolymerization in aqueous emulsion. The vinyl acetate replaces the alkyl ester of an acrylic or methacrylic acid, styrene or alpha-methyl styrene component in the insoluble microgel particles of the prior art. This considerably reduces the cost of the product, and it provides a product which forms extremely small solvent-swollen particles which are stably dispersed in the selected organic solvent medium and in the solvent solution coating composition in which these solvent dispersions are incorporated. Moreover, the dispersion copolymers of this invention are useful in smaller proportion, providing as much sag resistance when used at 3% or less than is provided by the prior art microgels at 5% or more. Also, and because the dispersion copolymers of this invention are extensively swollen by organic solvents and because the large proportion of vinyl acetate reduces their cost, they can be used in coatings which contain more than 15% of the dispersion copolymer component, even up to 100% of total resin solids (exclusive of curing agent).

The dispersions of the prior art are milky dispersions, whereas those of this invention can be only slightly cloudy or even substantially clear. One difference is that of particle size, the products of this invention being smaller. Also, the solvent swelling causes the solvent-swollen particle to have much the same refractive index as the solvent, so these very tiny particles are hard to see and the dispersions resemble a solution. Maximum solvent swelling evidenced by minimal cloudiness is preferred in this invention because it leads to sag-resistant solution coating compositions which require very little cross-linked polymer solids and which are viscosity stable with time.

It is desired to stress that vinyl acetate was not thought to be able to provide good performance in industrial coatings because it does not perform well in solution coating compositions and it tends to hydrolyze in water. It is surprising to find that large amounts of vinyl acetate in the environment of this invention provides a dispersion copolymer which is fully effective despite its production in aqueous medium and the fact that the product is extensively swollen by organic solvent prior to use. These extensively swollen vinyl acetate-containing dispersion copolymers do not degrade the coating performance, particularly because they can be used in such small amounts and because solvent swelling enhances compatibility.

The monomers which are copolymerized in aqueous emulsion to produce the cross-linked copolymer dispersions desired in accordance with this invention comprise: 1- vinyl acetate; and 2- a polyethylenically unsaturated cross-linking agent. As an optional component, one may also employ a third monomer which may be reactive or nonreactive, and this represents a further difference from the prior art which demanded that there by an acrylic or methacrylic ester providing hydroxy or carboxyl groups. Thus, the copolymer may contain some other monomer, like ethyl acrylate, and this monomer may be a reactive monomer providing a group containing a reactive hydrogen atom which reacts under normal baking conditions for thermosetting coatings. These groups are illustrated by the carboxylic acid group, the hydroxy group, the N-methylol group or an ether thereof with a volatile alcohol, the amine group providing one or more amino hydrogen atoms, and the amide group.

The carboxylic acid group may be provided using acrylic acid, methacrylic acid or maleic acid. The hydroxy group can be provided using 2-hydroxyethyl acrylate or methacrylate. The N-methylol group can be provided using N-methylol acrylamide or N-methylol methacrylamide, or an alkyl or alkoxyalkyl ether of said amides, like the isobutyl ether. The amine group can be provide using allyl amine. The amide group can be provided using acrylamide or methacrylamide. The precise nature of the reactive group is not of prime concern, so long as the selected group provides a reactive hydrogen atom, or generates such a hydrogen atom on baking.

When vinyl acetate is used to provide a significant proportion of the microgel copolymer, the copolymers have high molecular weight and relatively little polyethylenically unsaturated cross-linking agent is needed to provide the desired high molecular weight solvent-swellable copolymer.

The proportions which may be used can vary considerably, it being understood that throughout this document, including its claims, all proportions are by weight, unless otherwise specified.

Accordingly, the vinyl acetate component should be used in an amount of from 15% to 80% of the copolymer, but is preferably used in an amount of from 25% to 60%, and the polyethylenically unsaturated cross-linking agent is used in an amount of from 5% to 70% of the copolymer, but preferably in an amount of from 15% to 60%. Other monoethylenic monomers may be absent or they can be used in an amount of from 1% to 40% of the copolymer, preferably from 5% to 25%. These other monomers may be inert, like ethyl acrylate, but preferably include a reactive hydrogen atom, as has been discussed, most preferably an hydroxyl group. A preferred dispersion copolymer will thus contain about 40% vinyl acetate, about 10% of an hydroxy monomer, like 2-hydroxyethyl methacrylate or 2-hydroxypropyl methacrylate, and about 50% of a polyethylenically unsaturated monomer, which is preferably a polyacrylate or polymethacrylate, like hexane diol diacrylate.

As can be seen, a very considerable proportion of the dispersion copolymer in now vinyl acetate, so vinyl acetate can dominate the copolymer character and provide a significant economy. The economy achieved by this invention is further emphasized by the capacity of the vinyl acetate dispersion copolymer to produce effective sag resistance in smaller amounts than were previously required. In some situations as little as 0.1% provides a significant improvement in sag resistance. Up to about 50% may be used in practical coating compositions since the reduced cost of the cross-linked copolymer dispersions permits larger amounts thereof to be present in the final solution coating composition. Indeed, excellent coatings can be produced using a curing agent, like a melamine-formaldehyde resin, in the absence of any additional polymer, the melamine resin reacting with the hydroxy groups in the dispersion copolymer.

It is desired to maximize the proportion of vinyl acetate which is used since this is the least costly of all the monomers which are employed, and this is why the preferred proportion of this component in the copolymer is so high. Also, the proportion of reactive hydrogen atoms in the copolymer need not be very high in order to provide good sag resistance, and this is why this component can be totally absent, or if present, is preferably present in small proportion and subject to wide variation. Hydroxy groups are presently preferred to provide the reactive hydrogen atoms.

The polyethylenically unsaturated cross-linking agents which are used in this invention are subject to considerable variation. This invention will be illustrated using hexanediol diacrylate which is presently preferred. However, other diacrylates can be used, such as 1,4-butanediol diacrylate and glycerin diacrylate. Trimethylol propane diacrylate is also quite useful, but higher functionality is also permitted, such as with trimethylol propane triacrylate, pentaerythritol triacrylate and tetracrylate. While the acrylates are preferred, because of their higher reactivity, one can well use the corresponding methacrylates, such as trimethylol propane trimethacrylate. One need not use esters, since the reaction product of 1,6-hexane diol with two molar proportions of N-methylol acrylamide is also useful. Divinyl benzene, ethylene glycol diallyl ether and similar polyethylenically unsaturated low molecular weight materials, and even oligomers, such as the reaction product of trimethylol propane with two molar proportions of the monoisocyanate formed by reacting one molar proportion of toluene diisocyanate with one molar proportion of 2-hydroxyethyl acrylate, can be used.

The copolymers are produced in aqueous emulsion since this maximizes the molecular weight, and hence the insolubility in organic solvent which will later be relied upon. The aqueous emulsion copolymerization is itself conventional and illustrated in the examples. Since fine particle size is desired, anionic surfactants are preferably used, as will be illustrated. The result is a dispersion of finely divided, copolymer particles in an aqueous medium, and these particles can be recovered or made available in various ways, as by addition of an azeotropic organic solvent followed by azeotropic removal of the water, or by coalescing the particles with butanol and then decanting the liquid from the coagulated solids.

In the presence of a more active solvent, like methyl amyl ketone, the copolymer particles separate to form tiny particles which are swollen by the active solvent and which are difficult to see in the solvent medium because the solvent imbibed into the particle causes its refractive index to approach that of the solvent. The extent of solvent swelling can thus be gauged by the achievement of substantial clarity, whereas the prior art dispersions of microparticles are milky and relatively opaque. Another way to measure this is by the increased size of the microparticles, the solvent serving to swell the particle so that the average diameter is at least 30% larger, preferably at least 50% larger, than when the same particle is dispersed in water in the absence of active solvent.

Active solvents are themselves well know, and, in this invention need merely have the capacity of separating the particles to form a stable suspension. Ketones are particularly effective, such as methyl ethyl ketone, or diethyl ketone, but methyl amyl ketone is preferred.

One can then add a solvent solution of a film-forming resin, or the monomer components of that resin, and form the resin in-situ. The latter procedure is preferred because it minimizes the proportion of organic solvent in the final resin solution. However, one can always remove some of the solvent after the resin is present to provide the solids content which is desired.

The preferred soluble resins are acrylic in that a least 50% of the resin is constituted by polymerized acrylic or methacrylic acids or esters thereof, these esters including hydroxy-functional esters. It is surprising to find that the vinyl acetate dispersion copolymers of this invention perform well in combination with such soluble resins which are themselves free of vinyl acetate.

Accordingly, the cross-linked dispersion copolymers of this invention are used in thermosetting solvent solution coating compositions which comprise organic solvent having dissolved therein a reactive film-forming resin, a curing agent for that resin, and preferably from 0.5% to 30%, based on the total weight of resin, including curing agent, of the cross-linked dispersion copolymer of this invention. This film-forming resin is preferably a solvent solution copolymer of monoethylenically unsaturated monomers. While thermoplastic coatings are also benefitted, the solvent solution copolymers desirably contain reactive groups of the same character noted previously, but preferably contain hydroxy and/or carboxy groups. In thermosetting coatings in which the film-forming resin is reactive, the solution will also contain from 5% to 50% of total resin solids of a curing agent reactive with the groups in the film forming resin so that the coating composition will cure when baked.

The curing agents are themselves well known, the usual curing agents being aminoplast resins, phenoplast resins and blocked organic polyisocyanates. The preferred curing agents are aminoplast resins which are usually urea and melamine formaldehyde condensates, or ethers thereof. This invention will be illustrated with hexamethoxymethyl melamine, which is presently preferred. Also, phenol formaldehyde condensates and diisocyanates, like octanol-blocked toluene diisocyanate, are useful herein as curing agents.

In particularly preferred practice, the cross-linked dispersion copolymers comprise from 5% to 25% of copolymerized monomer providing a reactive group which is also reactive with the curing agent, especially the hydroxy group, as in 2-hydroxyethyl acrylate.

The invention is illustrated in the Examples which follow.

EXAMPLE 1

1680 grams of deionized water and 9 parts of an anionic surfactant were charged to a reactor and heated to 75° C. The anionic surfactant is a 50% aqueous solution of a mixture of surfactants which are: 70% of the sodium salt of the isodecanol half ester of sulfosuccinic acid; 14% of the sodium salt of sulfosuccinic acid with an alcohol exthoxylate in which the alcohol is isodecanol which has been ethoxylated with 20 molar proportions of ethylene oxide; and 16% of the sodium salt of the sulfosuccinic acid with a nonyl phenol which has been ethoxylated with 20 molar proportions of ethylene oxide (the American Cyanamid product Aerosol 501 may be used).

A first premix is made in a separate vessel to contain 143 grams of deionized water and 8 grams of ammonium persulfate. A second premix is made in another vessel to contain 680 grams of deionized water, 8 grams of the same surfactant mixture described above, 20 grams of tetrasodium N-(1,2-dicarboxy-ethyl)-N-octadecyl sulfosuccinamate (American Cyanamid product Aerosol 22 can be used), 269 grams of vinyl acetate, 67 grams of 2-hydroxypropyl methacrylate, and 320 grams of hexanediol diacrylate.

15 grams of the first premix is added to the reactor which is at 75° C. and heat is applied to raise the temperature to 80° C. Then, the balance of the first premix and all of the second premix are added slowly and concurrently to the reactor over a 2½ hour period while maintaining 80° C.

When the addition described above is completed, 15 grams of deionized water containing 0.8 grams of ammonium persulfate is slowly added over a 20 minute period and the reactor is held at 80° C. for 45 minutes to complete the polymerization, and the product is then cooled to obtain a fine particle size dispersion of high molecular weight extensively cross-linked copolymer having a solids content of 20%.

This copolymer contains 41.0% vinyl acetate, 10.2% 2-hydroxypropyl methacrylate, and 48.8% hexanediol diacrylate

EXAMPLE 2

368 grams of the aqueous dispersion of Example 1 are charged into a flask equipped with an agitator and a reflux condenser including a trap for removal of water. The trap is set with n-butanol, and the remainder of 92 grams of n-butanol and 230 grams of 2-ethoxyethanol acetate are added to the flask which is heated to 90° C. with rapid agitation.

A first premix of 200 grams of methyl methacrylate, 200 grams of 2-ethylhexyl acrylate, 102 grams of 2-hydroxyethyl methacrylate, 13 grams of acrylic acid, and 22 grams of tertiary dodecyl mercaptan is formed in one vessel. A second premix is prepared in a second vessel to contain 187 grams of n-butanol and 10 grams of azobisisobutyronitrile dissolved therein.

The first and second premix are then added slowly and concurrently to the flask over a 3 hour period while maintaining a temperature in the range of 90° C. to 100° C. and the water is progressively removed in the trap until all of the water theoretically present has been removed (294 grams). The reaction mixture is maintained at 100° C. for an additional hour whereupon 2 grams of the same catalyst are added and the mixture held for one hour and then 2 more grams of the same catalyst are added and the mixture held for another hour. The product is a solution of cross-linked dispersion copolymer.

After addition of 10 grams of 2-ethoxyethanol acetate, the product had a solids content of about 53%, an acid value of 30.39, and a Gardner-Holdt viscosity of P-R.

When hexamethoxymethyl melamine is incorporated into the above solution as curing agent, in an amount of 15% of the total weight of resin solids, it is found that deposited coatings will cure just as well as they did in the absence of the dispersion copolymer, but much thicker coatings can be deposited and baked without running or sagging when the coating is vertical during the bake. The dispersion copolymer does not significantly effect the viscosity of the resin solution prior to application, but instead stiffens the wet coating after much of the solvent has evaporated.

EXAMPLE 3

Example 1 is repeated using a corresponding weight proportion of isobutyoxy-methyl acrylamide in place of the hydroxypropyl methacrylate of that Example. Corresponding results are obtained.

EXAMPLE 4

Example 1 is repeated using a slightly reduced weight proportion of acrylamide in place of the hydroxypropyl methacrylate of that Example, and a slightly increased proportion of vinyl acetate. The final copolymer contained 44.1% of vinyl acetate, 7.0% of acrylamide, and 48.9% of hexanediol diacrylate. Corresponding results are again obtained.

EXAMPLE 5

Example 1 is repeating using a slightly different monomer balance which includes a small proportion of a triacrylate to provide a more tightly cross-linked copolymer. More particularly, 40.85% of vinyl acetate, 9.15% of 2-hydroxypropyl methacrylate, 45.75% of hexane diol diacrylate and 4.25% of pentaerythritol triacrylate were used instead of the proportions used in said Example 1. Again, the product was a fine particle size dispersion having a solids content of about 20%.

The above-described latex with its solids content of about 20.0% is placed in a settling vessel. There is then added to the latex at room temperature and while stirring a weight of butanol approximately equal to the weight of the resin solids in the latex. Addition of butanol is over a period of about 5 minutes.

In the presence of the added butanol, the particles of resin in the latex settle to form a mass at the bottom of the settling vessel beneath a clear liquid layer of butanol dissolved in water and containing the surfactants and other water-soluble materials used in the aqueous emulsion copolymerization. This liquid layer is then decanted to leave a mass of resin particles wet with a small amount of water and butanol. This wet mass is like a dough, but the particles of cross-linked resin are not coalesced in that wet mass and can be easily redispersed by the addition of an organic solvent.

The resin particles in this wet mass are then redispersed by adding an active organic solvent which is absorbed into the polymer particles to swell the same. In this example, the added solvent was a 50:50 weight ratio mixture of toluene and methyl amyl ketone. Sufficient solvent is added to provide a solvent dispersion of swollen copolymer particles having a solids content of 25.5%. This dispersion was translucent, indicating significant solvent has been absorbed into the copolymer particles.

This solvent dispersion is added to conventional high solids polyester resin coatings and also to high solids acrylic coatings. These coating compositions are solvent solution coatings containing a dissolved aminoplast resin (hexamethoxymethyl melamine) to thermoset the coating on baking. It was found that the addition of the solvent dispersion of this example in an amount providing the thermosetting coating compositions with 2% by weight of added cross-linked copolymer particles was effective to markedly improve flow resistance during the bake. This improved flow resistance is obtained without unduly increasing the viscosity of the coating composition and while obtaining cured coatings having about the same gloss as without the addition.

What is claimed is:

1. A suspension of solvent-swollen cross-linked dispersion copolymer in an active organic solvent, said copolymer being produced by the aqueous emulsion copolymerization of from 15% to 80% of vinyl acetate and from 5% to 70% of polyethylenically unsaturated cross-linking agent, any balance monoethylenic monomer, said proportions being based on the total weight of the copolymer, and said copolymer being swollen by said organic solvent to enlarge its solvent-free average particle size by at least 30%.

2. A suspension as recited in claim 1 in which from 1% to 40% of other copolymerizable monoethylenic monomer is also present in said copolymerization.

3. A suspension as recited in claim 2 in which said polyethylenically unsaturated cross-linking agent is used in an amount of from 15% to 60%.

4. A suspension as recited in claim 2 in which said other monomers are present in an amount of from 5% to 25%.

5. A suspension as recited in claim 1 in which said other monomers carry a reactive group containing a reactive hydrogen atom.

6. A suspension as recited in claim 5 in which said reactive hydrogen atom is provided by the hydroxy group.

7. A suspension as recited in claim 2 in which from 25% to 60% of vinyl acetate is present in the copolymer and the organic solvent is a ketone.

8. A suspension as recited in claim 2 in which said ketone is methyl amyl ketone.

9. A thermosetting solvent solution coating composition comprising organic solvent having dissolved therein a reactive film-forming resin, and a curing agent therefor, said composition containing the suspension of claim 1 providing from 0.1% to 50%, based on the total weight of resin, including curing agent, of the cross-linked dispersion copolymer of claim 2.

10. A thermosetting solvent solution coating composition as recited in claim 9 in which said film-forming resin is a solvent solution copolymer of monoethylenically unsaturated monomers containing groups reactive with said curing agent.

11. A thermosetting solvent solution coating composition as recited in claim 10 in which said film-forming resin contains reactive groups selected from hydroxy and carboxy groups.

12. A thermosetting solvent solution coating composition as recited in claim 10 in which said solution contains from 5% to 30% of said dispersion copolymer and from 5% to 50% of a curing agent reactive with said hydroxy and carboxy groups.

13. A thermosetting solvent solution coating composition as recited in claim 9 in which said dispersion copolymer comprises from 5% to 25% of copolymerized monomer providing a reactive group which is reactive with said curing agent.

14. A thermosetting solvent solution coating composition as recited in claim 13 in which said curing agent is an aminoplast resin.

15. A thermosetting solvent solution coating composition as recited in claim 14 in which said aminoplast resin is hexamethoxymethyl melamine.

16. A thermosetting solvent solution coating composition comprising organic solvent having dissolved therein a curing agent selected from the group consisting of aminoplast resin, phenoplast resin, and blocked polyisocyanate, said composition containing the suspension of claim 1 providing from 0.1% to 50%, based on the total weight of resin, including said curing agent, of the cross-linked dispersion copolymer of claim 2.

* * * * *